G. ANSTON AND G. P. PETROPULOS.
COFFEE MAKING APPARATUS.
APPLICATION FILED DEC. 10, 1921.

1,408,963.

Patented Mar. 7, 1922.

INVENTOR
G. Anston
BY G. P. Petropulos
ATTORNEYS

UNITED STATES PATENT OFFICE.

GEORGE ANSTON AND GEORGE P. PETROPULOS, OF CHICAGO, ILLINOIS.

COFFEE-MAKING APPARATUS.

1,408,963.

Specification of Letters Patent. Patented Mar. 7, 1922.

Application filed December 10, 1921. Serial No. 521,375.

*To all whom it may concern:*

Be it known that we, GEORGE ANSTON and GEORGE P. PETROPULOS, both subjects of the King of Greece, and residents of Chicago, in the county of Cook and State of Illinois, have invented a new and useful Improvement in Coffee-Making Apparatus, of which the following is a full, clear, and exact description.

Our invention relates to improvements in coffee making apparatus, and it consists in the combinations, constructions, and arrangements herein described and claimed.

With the coffee making devices of ordinary construction, when the level of the liquid has fallen below the coffee containing sack and it is desired to make the coffee stronger, it is necessary to first remove the cover of the device and to then drain off a portion of the liquid and to pour the same over the coffe grounds.

The principal object of our invention is to provide a coffee making apparatus in which a fluid is adapted to be passed over the coffee grounds and at the same time to entrain the coffee liquid that is below the coffee grounds to above the grounds, whereby the liquid will again be passed through the grounds.

A further object of our invention is to provide a device of the type described which has manually controlled means for causing the coffee liquid to be passed through the coffee grounds, and which also has means for percolating the coffee.

A further object of our invention is to provide a device of the type described which is simple in construction, and which is not likely to easily get out of order.

Other objects and advantages will appear in the following specification, and the novel features of the invention will be particularly pointed out in the appended claims.

Figure 2:
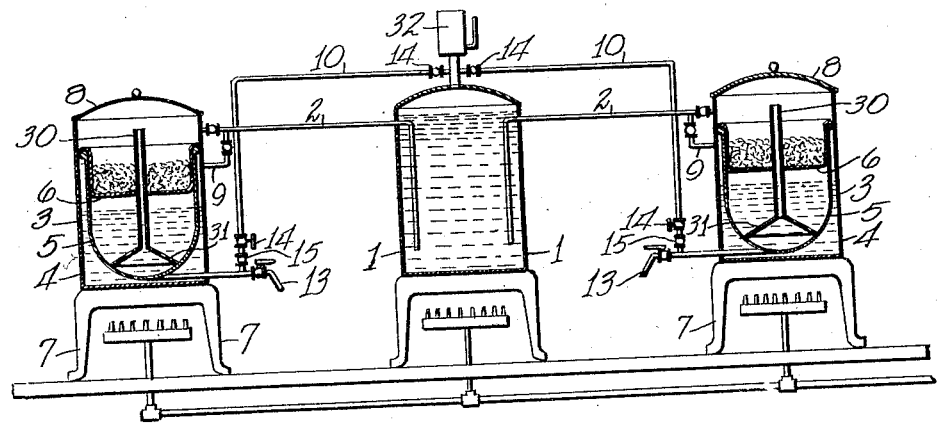
Figure 2:
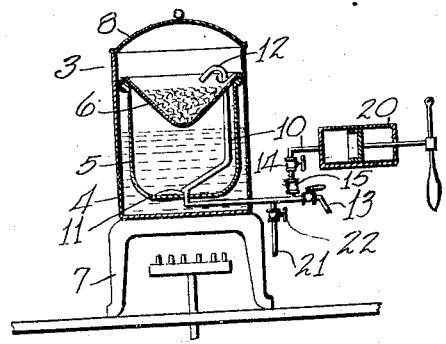
Figure 1:
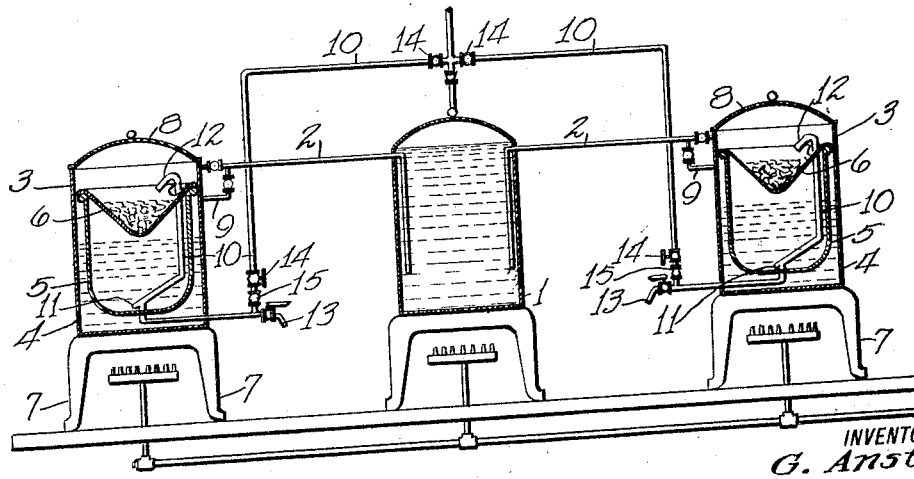

Our invention is illustrated in the accompanying drawings, forming part of this application, in which Figure 1 is a diagrammatic view of the device, Figure 2 is a diagrammatic view of a modified form of the device, and Figure 3 is a diagrammatic view of another modified form of the device.

In carrying out our invention, we provide a water boiler 1 which is connected by water pipes 2 to two coffee making devices 3 (see Figure 1). Since both of the coffee making devices are identical with respect to each other, the description of one will suffice. The coffee device 3 is provided with a casing 4, a liquid container 5, and a coffee containing sack 6. The casing 4 is supported by legs 7 and has a removable cover 8 disposed thereon. Gas burners or the like are disposed under the casing 4 and under the boiler 1.

The pipe 2 is bent downwardly inside of the boiler 1 so that the lower end thereof is submerged in the water. The other end of the pipe 2 is provided with a branch 9, whereby water can be emitted to the liquid container 5 or to the space between the container 5 and the casing 4. With this construction, the water in the casing 4 when heated, will keep the liquid in the container 5 hot for a great length of time.

A steam pipe 10 extends from the boiler 1 to the casing 4 and is bent upwardly so as to project through the bottom of the container 5. The pipe 10 is provided with an opening 11 at this point and is then bent upwardly so as to lie adjacent to the wall of the container 5. The pipe terminates in a downwardly extending spout 12 which is disposed above the level of the coffee grounds in the sack 6.

From the foregoing description of the various parts of the device, the operation thereof may be readily understood. Assume that the level of the liquid in the container 5 has fallen below the bottom of the sack 6 and that it is desired to make the coffee stronger. The valves 14 in the pipe 10 are opened. This permits live steam to pass through the pipe 10 and out of the spout 12. The check valve 15 prevents any of the liquid in the container from backing up into the pipe 10. As the steam rushes through the pipe 10 it entrains the liquid from the container 5 and carries it up over the coffee grounds.

If desired a constant percolation of the coffee may be had by lighting the burner 16 which will heat the water in the lower part of the container 5 and will cause it to pass above the grounds.

In Figure 2 of the drawing we show a slightly modified form of the device to that shown in Figure 1. In this form the pipe 10 is connected to a hand pump 20. A pipe 21 is connected to the pipe 10 and is also connected to a source of compressed air (not shown). It is obvious that the liquid in the container 5 can be poured over the coffee grounds by either actuating the pump 20 or by opening the valve 22.

Another modified form of the device is shown in Figure 3. This form of the device is identical to that form of the device which is shown in Figure 1, except that in this form, the pipe 10 terminates at the bottom of the container 5, and a pipe 30 having a perforated base 31 takes the place of the portion of the pipe 10 which projects upwardly in the container 5.

In the operation of this form of the device, the steam flows from the pipe 10 up through the pipe 30 and entrains the fluid, which flows through the perforated base, along therewith. The fluid is ejected from the the pipe 30 and falls upon the coffee grounds. It is also apparent that by lighting the burner 16, the liquid will be percolated by means of the pipe 30. A safety valve is connected to the pipe 10 to permit the ready escape of the steam if the latter exceeds a predetermined pressure.

It will be obvious from the foregoing that we have provided a device which is simple in construction and which is effective for the purpose intended.

We claim:

1. A device of the type described comprising a fluid source of supply, a liquid container, a coffee containing sack carried by said container, a fluid conveyor connected with said source and projecting through the bottom of said container and terminating above the coffee sack, said conveyor having openings therein adjacent to the bottom of the container.

2. A device of the type described comprising a liquid container, a steam boiler, a coffee sack carried by said container, a steam pipe connected to said boiler and projecting upwardly through the bottom of said container and terminating above said sack, said pipe having an opening therein adjacent to the bottom of said container, and a water pipe connecting said boiler with said container.

3. A device of the type described comprising a liquid container, a source of air supply, a coffee sack carried by said container, and an air pipe connecting said source of air supply with said container and projecting upwardly in said container and terminating above said sack, said pipe having an opening adjacent to the bottom of said container.

4. A device of the type described comprising a liquid container, a steam boiler, a coffee sack carried by said container, a steam pipe connected to said boiler and opening into the bottom of said container, a second pipe disposed in said container and having a perforated base, the upper end of said second named pipe projecting above said sack, and a water pipe connecting said boiler with said container.

5. A device of the type described comprising a liquid container, a steam boiler, a coffee sack carried by said container, a steam pipe connected to said boiler and opening into the bottom of said container, a second pipe disposed in said container and having a perforated base, the upper end of said second named pipe projecting above said sack, and a water pipe connecting said boiler with said container, said pipe having a branch in communication with the exterior of said container

GEORGE ANSTON.
GEORGE P. PETROPULOS.